(12) United States Patent
Jutila et al.

(10) Patent No.: US 8,529,176 B2
(45) Date of Patent: Sep. 10, 2013

(54) REMOVABLE TIE-DOWN ASSEMBLY

(75) Inventors: Brian J. Jutila, Richmond, MI (US);
David K. Rock, Washington, MI (US);
Ronald J. Wojciechowski, Sterling Heights, MI (US); Srinivasa A. Mandadapu, Sterling Heights, MI (US);
Michael J. Clark, Wixom, MI (US);
Vanessa Menezes Oliveira, Sao Paulo (BR)

(73) Assignee: GM Global Technology Operations LLC, Detroit, MI (US)

( * ) Notice: Subject to any disclaimer, the term of this patent is extended or adjusted under 35 U.S.C. 154(b) by 220 days.

(21) Appl. No.: 13/009,152

(22) Filed: Jan. 19, 2011

(65) Prior Publication Data
US 2012/0181816 A1 Jul. 19, 2012

(51) Int. Cl.
*B60P 7/08* (2006.01)
(52) U.S. Cl.
USPC ............................ 410/106; 410/110; 410/116
(58) Field of Classification Search
USPC ................. 410/106, 109, 110, 112, 113, 116; 24/115 K, 265 CD; 248/499
See application file for complete search history.

(56) References Cited

U.S. PATENT DOCUMENTS
5,738,471 A * 4/1998 Zentner et al. ................ 410/110

* cited by examiner

*Primary Examiner* — Stephen Gordon
(74) *Attorney, Agent, or Firm* — Quinn Law Group, PLLC

(57) ABSTRACT

A tie-down assembly for attachment to and detachment from a structure, such as a vehicle pick-up bed, includes a female fastener configured to collapse during insertion of the tie-down assembly into the structure. The female fastener is also configured to expand following the insertion for retention of the tie-down assembly on the structure. The tie-down assembly also includes a male fastener configured to threadably engage the female fastener. Additionally, the tie-down assembly includes a holder configured to retain and rotatably restrain the female fastener when the male fastener is being threaded into the female fastener and when the male fastener is being threaded out of the female fastener. The holder includes an aperture and the male fastener is configured to be inserted into the aperture. The holder is also configured to guide the female fastener to a fixed position for removal of the tie-down assembly from the structure.

14 Claims, 4 Drawing Sheets

REMOVABLE TIE-DOWN ASSEMBLY

TECHNICAL FIELD

The invention relates to a removable tie-down assembly.

BACKGROUND

A tie-down is used to hold and restrain objects from shifting around and falling into disarray. Tie-down hardware is typically used to turn webbing into a tie-down strap. Such webbing is generally a strong fabric woven as a flat strip or tube of varying width and fibers often used in place of rope.

There are various categories of tie-down strap hardware that allow for the creation of a virtually unlimited number of different types of tie-down straps. Such pieces of hardware fall into several categories, including fasteners, end fittings, and buckles. Frequently, tie-down hardware is used to keep items inside vehicle cargo compartments from shifting around. Such devices are particularly useful for restraining the contents of pick-up truck beds.

SUMMARY

A tie-down assembly for attachment to and detachment from a structure includes a female fastener configured to collapse during insertion of the tie-down assembly into the structure. The female fastener is also configured to expand or recover following the insertion for retention of the tie-down assembly on the structure. The tie-down assembly also includes a male fastener configured to threadably engage the female fastener. Additionally, the tie-down assembly includes a holder configured to retain and rotatably restrain the female fastener when the male fastener is being threaded into the female fastener for fastening of the tie-down assembly to the structure, and when the male fastener is being threaded out of the female fastener. The holder includes an aperture, while the male fastener is configured to be inserted into the aperture. The holder is also configured to guide the female fastener to a fixed position for removal of the tie-down assembly from the structure.

The male fastener may be at least partially threaded out of the female fastener and then pushed into the holder during the removal of the tie-down assembly from the structure, such that the female fastener is guided to the fixed position.

The holder may include a locking feature configured to retain the female fastener in the fixed position. Additionally, the holder may include a pair of substantially parallel flexible projections and the locking feature may be incorporated into the projections. In such a case, each of the pair of the substantially parallel projections may include a ramped channel culminating in a pocket that defines the fixed position. Additionally, in such a case, the female fastener may include a pair of knobs such that each knob is configured to engage one of the ramped channels, wherein each ramped channel is configured to guide the female fastener to the respective pocket.

The holder may also include a plate arranged perpendicular to the male fastener and configured to spread the fastening load across an area on the structure. The holder may be formed from a plastic material.

The male fastener may include a loop configured to facilitate being grasped by an operator. In such a case, the loop may be characterized by one of a fixed and a collapsible configuration.

The female fastener may be configured as a nut attached to a spring-loaded anchor. In such a case, the spring-loaded anchor may be configured to collapse by folding up during insertion of the tie-down assembly into the structure, and to recover by unfolding following the insertion for retention of the tie-down assembly on the structure.

The aforementioned structure may be that of a bed of a pick-up truck. In such a case the pick-up truck bed may have an opening configured to accept the tie-down assembly.

The above features and advantages and other features and advantages of the present invention are readily apparent from the following detailed description of the best modes for carrying out the invention when taken in connection with the accompanying drawings.

DETAILED DESCRIPTION

Figure 1:
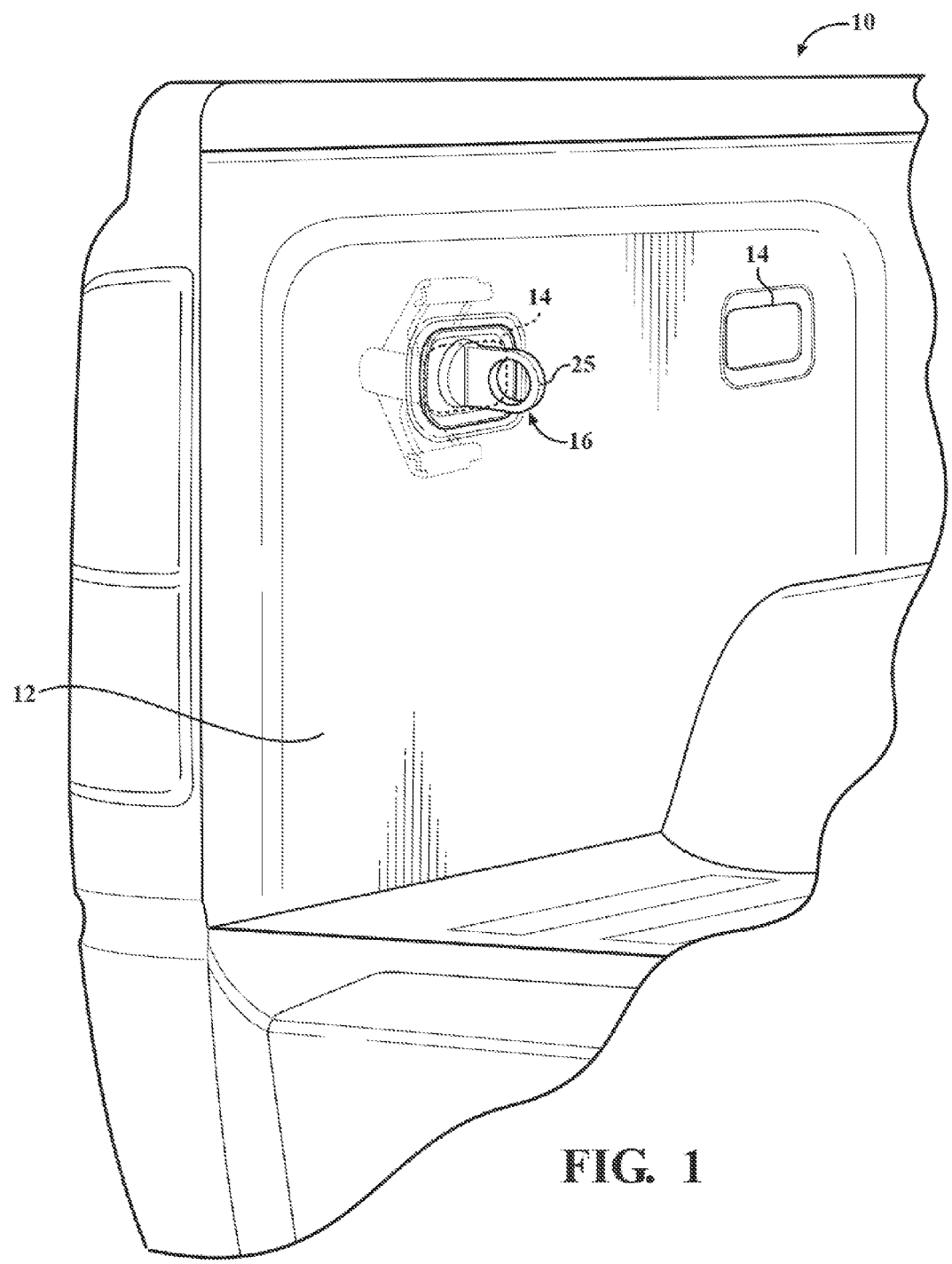
FIG. 1 is a perspective view of a tie-down having a fixed loop, the tie-down is shown installed on a bed of a pick-up truck.

Referring to the drawings, wherein like reference numbers refer to like components, FIG. 1 shows a section of a vehicle 10. As shown, the vehicle 10 includes a pick-up bed 12 that is configured as a structure for holding various cargo in the vehicle. The pick-up bed 12 includes a plurality of openings 14. Each opening 14 is shown as having a generally oblong shape, such as an oval or a rectangle. The oblong shape of the opening 14 may thus facilitate positional orientation of an item that is engaged therewith. As shown, each of the openings 14 positions and orients a tie-down assembly 16.

Figure 2:
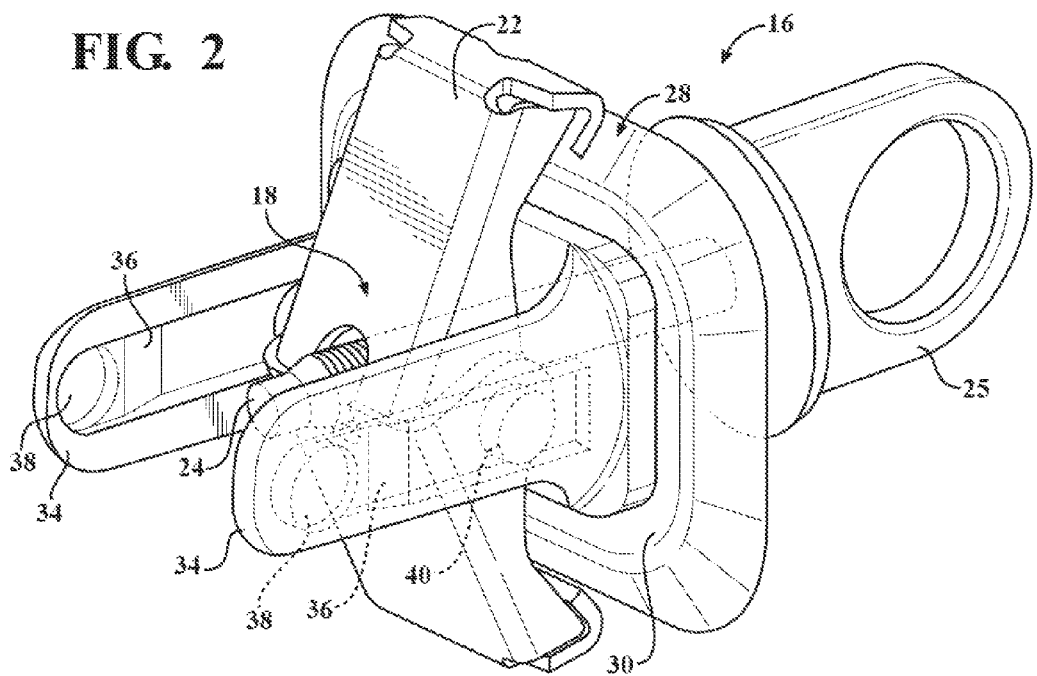
FIG. 2 is a perspective view of the tie-down shown in FIG. 1, the tie-down is shown in a pre-assembled state with a male fastener loosened and pulled out such that the female fastener is positioned against the holder.
Figure 3:
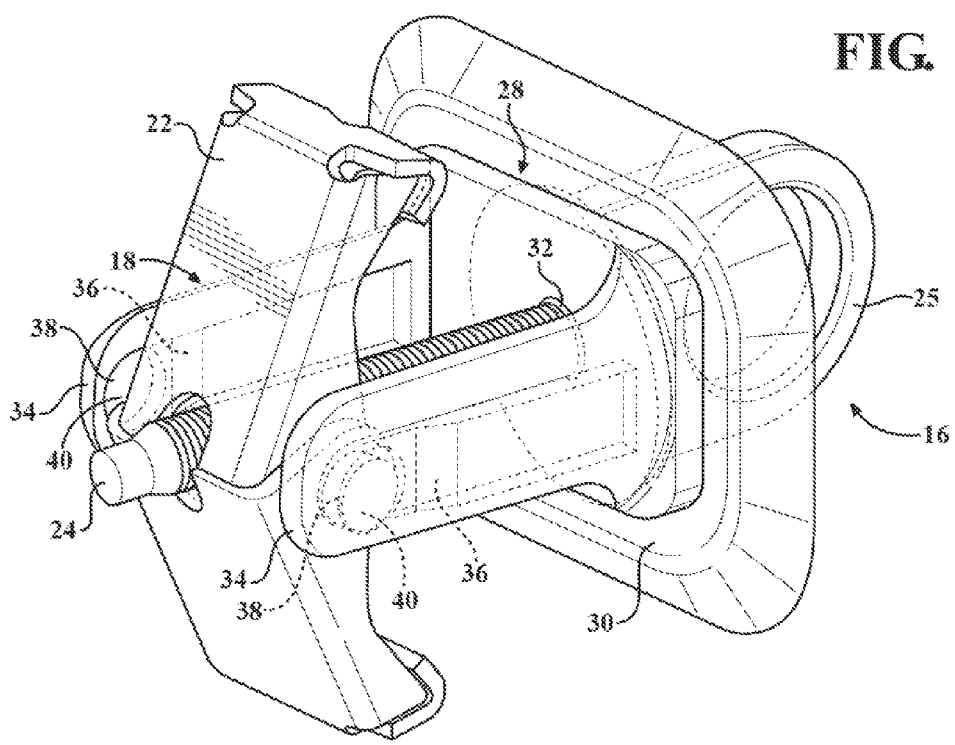
FIG. 3 is a perspective view of the tie-down shown in FIG. 1, the tie-down is shown in a pre-assembled state with the male fastener loosened and pushed in against the holder.
Figure 4:
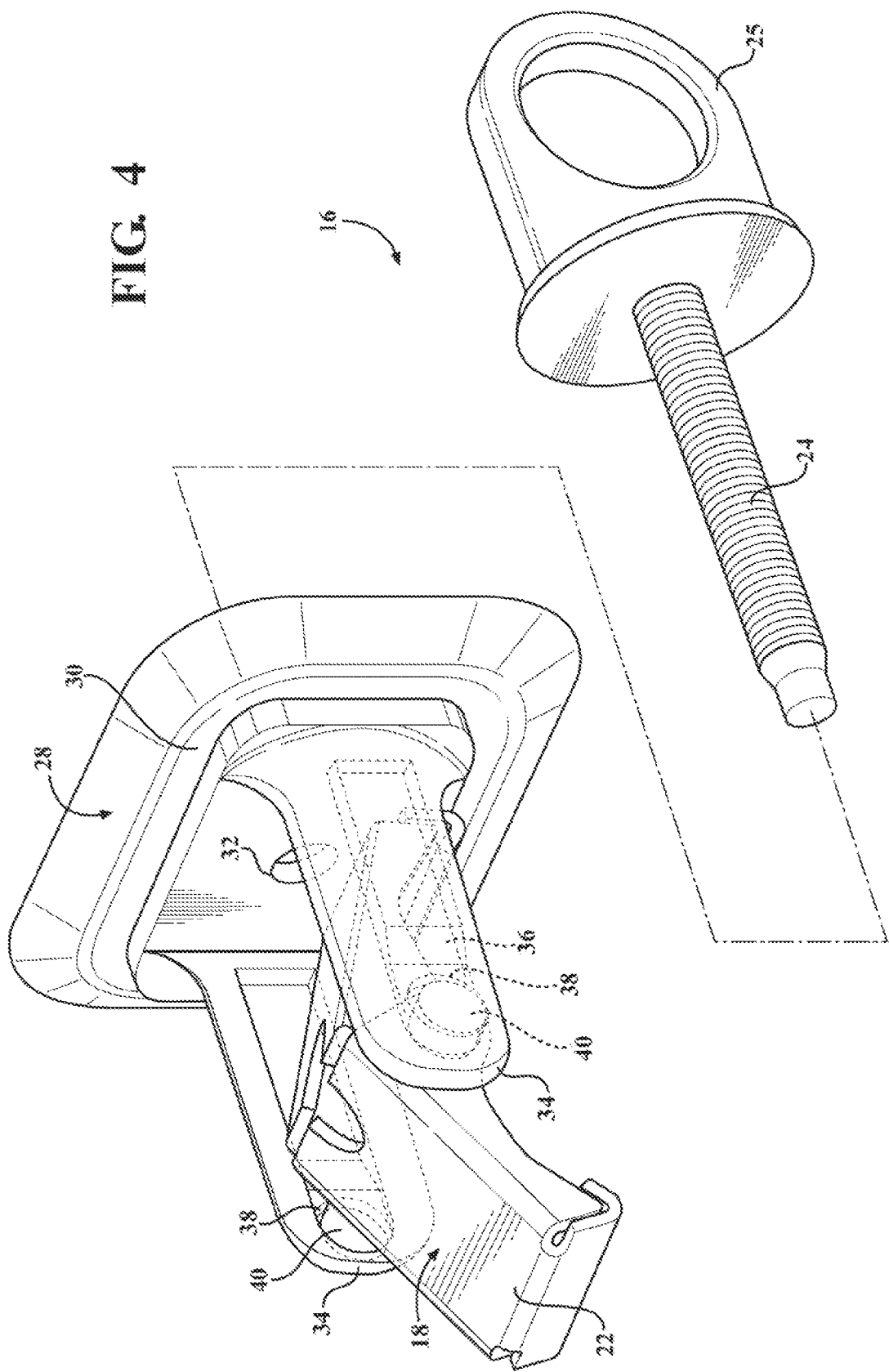
FIG. 4 is a perspective view of the tie-down shown in FIG. 1, the tie-down is shown in a pre-assembled state with the male fastener removed from the female fastener and the female fastener pivoted in line with the male fastener.
Figure 5:
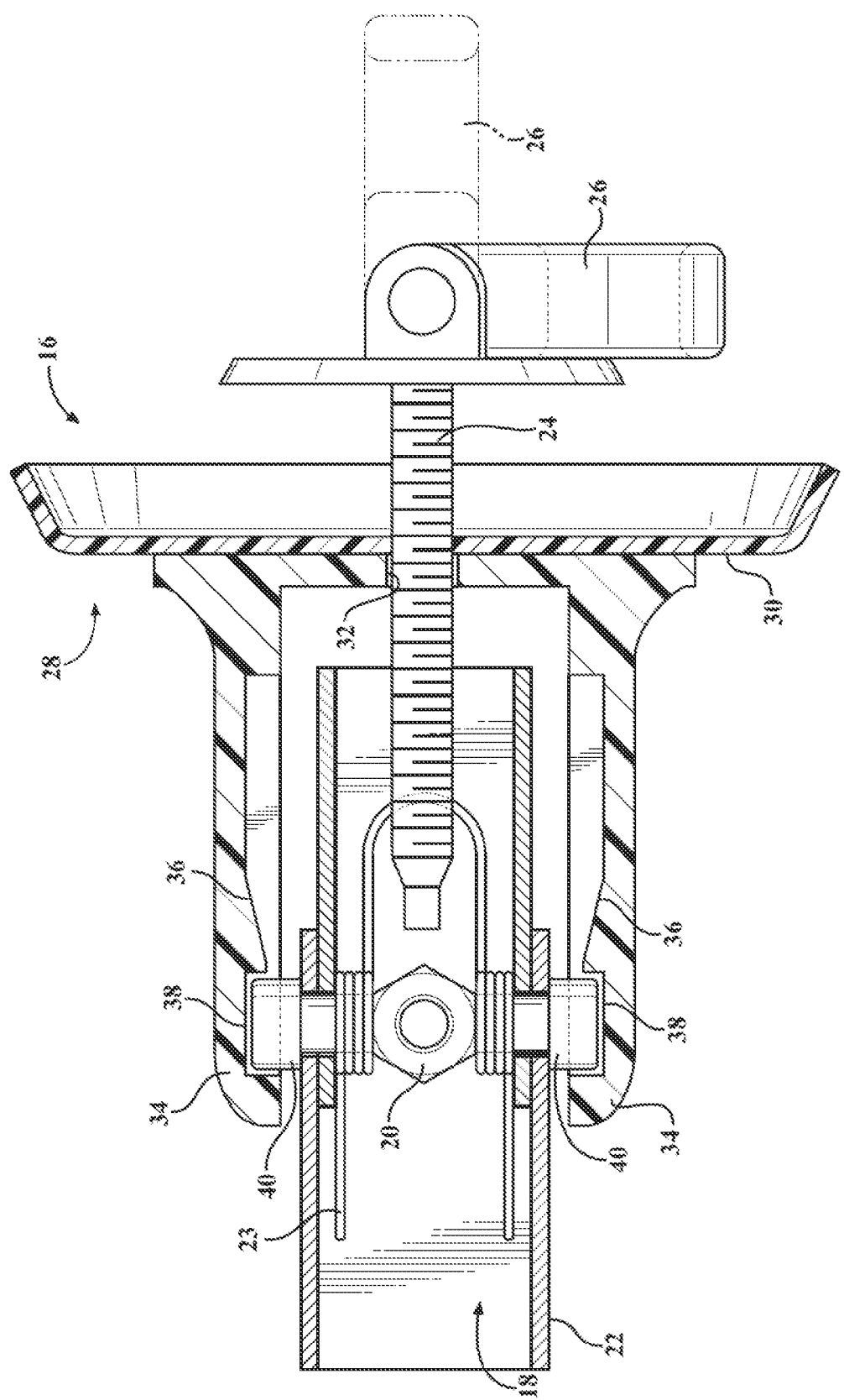
FIG. 5 is a cross-sectional view of a tie-down identical in all regards to the tie-down shown in FIG. 1, other than having a pivotable loop; the tie-down is shown in a pre-assembled state with a locking feature configured to retain the female fastener in a fixed position.

The tie-down assembly 16 is configured for selective attachment to the pick-up bed 12 by insertion into the opening 14 and detachment from the pick-up bed. The tie-down assembly 16 is configured to accept an attachment of various webbing (not shown) thereto in order to turn such webbing into a tie-down strap for restraining cargo inside the pick-up bed 12. As shown in FIG. 2, the tie-down assembly 16 includes a female fastener 18. The female fastener 18 may be configured as a nut 20 attached to an anchor 22 that is spring-loaded into a splayed configuration by a spring 23 (as shown in FIG. 5). As shown in FIG. 2, the tie-down assembly 16 also includes a male fastener 24. The male fastener 24 is configured to threadably engage the nut 20 of the female fastener 18. The male fastener 24 may include a fixed loop 25, as shown in FIGS. 1-4, or a collapsible or pivotable loop 26, as shown in FIG. 5. Either of the loops 25, 26, is configured to facilitate being grasped by an operator for selective engagement to and disengagement from the female fastener 18. The fixed loop 25 may be either formed as part of the male fastener 24 or rigidly attached thereto. The collapsible loop 26 may, for example, be formed by crimping a wire ring to the male fastener 24 sufficiently loosely to permit the wire ring to be turned with respect to the tie-down assembly 16. The collapsible loop 26 provides the added benefit of being folded out of the way of contents of the pick-up bed 12 when not in use, while the fixed loop 25 may be formed to provide a more robust construction of the male fastener 24.

As shown in FIG. 2, the tie-down assembly 16 additionally includes a holder 28. The holder 28 is configured to retain and rotatably restrain the female fastener 18 when the male fastener 24 is being selectively threaded into and out of the female fastener. The holder 28 includes a plate 30. When the male fastener 24 is engaged with the female fastener 18, the plate 30 is disposed substantially orthogonally to the male fastener. The plate 30 is configured to spread the fastening load of the tie-down assembly 16 across a sufficient area on the pick-up bed 12 such that the tie-down assembly may withstand significant forces from the attached webbing while restraining cargo. The plate 30 includes an aperture 32 formed therein (shown in FIGS. 3-5) that is configured to accept the male fastener 24 for insertion into the holder 28 for subsequent engagement with the female fastener 18. The holder 28 may be formed from a durable material that may flex under load and then recover its original shape. Such a material may be a type of a plastic, for example a glass-filled nylon.

The holder 28 additionally includes a pair of substantially parallel projections 34. A cross-sectional view of the tie-down assembly 16, including the detailed construction of the projections 34, is shown in FIG. 5. Other than having a pivotable loop 26 that was described in detail above, the tie-down assembly 16 shown in FIG. 5 is identical in all regards to the tie-down assembly shown in FIGS. 1-4. Each projection 34 is shown in FIGS. 2-5 as a leg extending outwardly from and generally orthogonally to the plate 30.

Each projection 34 includes a ramped channel 36 that culminates in a pocket 38 which defines a fixed position for the female fastener 18. Each ramped channel 36 is embedded on the surface of the respective projection 34 such that the ramped channels face one another and provide a guide for the female fastener 18. The channels 36 are configured to guide the female fastener 18 to a fixed position defined by the pockets 38 for removal of the tie-down assembly 16 from the pick-up bed 12, which will be described in greater detail below.

As may be seen in FIG. 5, the anchor 22 incorporates a pair of knobs 40. Each knob 40 is configured to fit into and engage one of the respective ramped channels 36. Accordingly, each ramped channel 36 is configured to guide one respective knob 40 of the female fastener 18 to the respective pocket 38. When the female fastener 18 is driven by the male fastener 24 along the ramped channels 36 toward the pockets 38, the flexible projections 34 are spread apart by the knobs 40. The flexible projections 34 thus permit the anchor 22 to be guided by the ramped channels 36 while being displaced by the male fastener 24, and to be snapped into the fixed position defined by the pockets 38. Accordingly, the combination of the flexible projections 34, the ramped channels 36, and the pockets 38 of the holder 28 generate a locking feature that is configured to retain the female fastener 18 in the fixed position. The retention of the female fastener 18 in the fixed position that is defined by the pockets 38 in turn facilitates the removal of the tie-down assembly 16 from the pick-up bed 12, as will be described in detail below.

In operation, the tie-down assembly 16 may be pre-assembled prior to being inserted into the opening 14, i.e., with the male fastener 24 being partially threaded into the nut 20 of the female fastener 18. The anchor 22 of the female fastener 18 is configured to collapse by folding up during the insertion of the tie-down assembly 16 into the opening 14. Due to the spring-loaded nature of the anchor 22, the female fastener 18 is also configured to recover by unfolding following the insertion into the opening 14 for retention of the tie-down assembly 16 on the pick-up bed 12. Following the recovery of the anchor 22, the male fastener may be threaded into the nut 20 until the tie-down assembly 16 is fully tightened for retention of the assembly on the pick-up bed 12.

To remove the tie-down assembly 16 from a particular opening 14, depending on the particular configuration of the male fastener 24, either loop 25 or 26 is grasped by an operator to thread out or unscrew the male fastener from the nut 20. During removal of the tie-down assembly 16, to the extent that the tie-down assembly has been loosened, the male fastener 24 may be partially backed out of the female fastener 18 and then pushed into the holder 28. As the male fastener 24 is pushed into the holder 28, the knobs 40 of the female fastener 18 are displaced toward the pockets 38, thus spreading apart the flexible projections 34, and are finally snapped into the fixed position within the pockets.

After the female fastener 18 is snapped into the fixed position, the male fastener 24 may be fully disengaged from the nut 20, which will permit the anchor 22 to assume a position that is substantially in line with the male fastener and perpendicular to the plate 30. The anchor 22 is weighted such that its natural balanced orientation is substantially perpendicular to the plate 30. Such position of the anchor 22 allows the female fastener to clear the opening 14 and the tie-down assembly 16 to be removed from the pick-up bed 12. The snapping of the knobs 40 into the fixed position within the pockets 38 may furthermore be configured to generate an audible signal, thus informing the operator that the male fastener may be fully disengaged from the nut 20 in order to complete the removal of the tie-down assembly 16.

While the best modes for carrying out the invention have been described in detail, those familiar with the art to which this invention relates will recognize various alternative designs and embodiments for practicing the invention within the scope of the appended claims.

The invention claimed is:

1. A tie-down assembly for attachment to and detachment from a structure, the tie-down assembly comprising:
   a female fastener configured to collapse during insertion of the tie-down assembly into the structure and to expand following the insertion for retention of the tie-down assembly on the structure;
   a male fastener configured to threadably engage the female fastener; and
   a holder configured to retain and rotatably restrain the female fastener when the male fastener is being threaded into and out of the female fastener;
   wherein:
      the holder includes an aperture formed therein and the male fastener is configured to be inserted into the aperture;
      the holder defines a fixed position for the female fastener-and is additionally configured to guide the female fastener to the fixed position and retain the female fastener therein for removal of the tie-down assembly from the structure;
      the holder includes a pair of substantially parallel flexible projections and each of the pair of substantially parallel flexible projections includes a ramped channel culminating in a pocket that defines the fixed position;

the female fastener includes a pair of knobs, wherein each knob is configured to engage one of the ramped channels; and each ramped channel is configured to guide the female fastener to the respective pocket.

2. The tie-down assembly of claim 1, wherein the male fastener is configured to be at least partially threaded out of the female fastener and then pushed into the holder during the removal of the tie-down assembly from the structure, such that the female fastener is guided to the fixed position.

3. The tie-down assembly of claim 1, wherein the holder includes a plate arranged perpendicular to the male fastener and configured to spread a fastening load across an area on the structure.

4. The tie-down assembly of claim 1, wherein the holder is formed from a plastic material.

5. The tie-down assembly of claim 1, wherein the male fastener includes a loop configured to facilitate being grasped by an operator.

6. The tie-down assembly of claim 5, wherein the loop is characterized by one of a fixed and a collapsible configuration.

7. The tie-down assembly of claim 1, wherein the female fastener is configured as a nut attached to a spring-loaded anchor configured to collapse by folding up during insertion of the tie-down assembly into the structure, and configured to recover by unfolding following the insertion for retention of the tie-down assembly on the structure.

8. The tie-down assembly of claim 1, wherein the structure is a bed of a pick-up truck and the bed includes an opening configured to accept the tie-down assembly.

9. A vehicle comprising:

a pick-up bed having an opening; and a tie-down assembly configured for selective attachment to the pick-up bed by insertion into the opening and detachment from the pick-up bed, the tie-down assembly including:

a female fastener configured to collapse during insertion of the tie-down assembly into the opening of the pick-up bed and to expand following the insertion for retention of the tie-down assembly on the pick-up bed;

a male fastener configured to threadably engage the female fastener; and a holder having a plate arranged perpendicular to the male fastener and configured to retain and rotatably restrain the female fastener when the male fastener is threaded into and out of the female fastener;

wherein:

the holder includes an aperture formed therein and the male fastener is configured to be inserted into the aperture;

the holder defines a fixed position for the female fastener and is additionally configured to guide the female fastener to the fixed position and retain the female fastener therein for removal of the tie-down assembly from the pick-up bed;

the holder includes a pair of substantially parallel flexible projections and each of the pair of substantially parallel flexible projections includes a ramped channel culminating in a pocket that defines the fixed position;

the female fastener includes a pair of knobs, wherein each knob is configured to engage one of the ramped channels; and each ramped channel is configured to guide the female fastener to the respective pocket.

10. The vehicle of claim 9, wherein the male fastener is configured to be at least partially threaded out of the female fastener and then pushed into the holder during the removal of the tie-down assembly from the pick-up bed, such that the female fastener is guided to the fixed position.

11. The vehicle of claim 9, wherein the plate is configured to spread a fastening load across an area on the pick-up bed.

12. The vehicle of claim 9, wherein the holder is formed from a plastic material.

13. The vehicle of claim 9, wherein the male fastener includes a loop configured to facilitate being grasped by an operator, and the loop is characterized by one of a fixed and a collapsible configuration.

14. The vehicle of claim 9, wherein the female fastener is configured as a nut attached to a spring-loaded anchor configured to collapse by folding up during insertion of the tie-down assembly into the pick-up bed, and configured to recover by unfolding following the insertion for retention of the tie-down assembly on the pick-up bed.

* * * * *